(No Model.)

R. STALTER.
WHEEL.

No. 435,776. Patented Sept. 2, 1890.

Witnesses
Saml R Turner
Van Buren Hillyard.

Inventor
Robert Stalter.
By his Attorneys
R S & H S Lacey

THE NORRIS PETERS CO., PHOTO-LITHO., WASHINGTON, D. C.

UNITED STATES PATENT OFFICE.

ROBERT STALTER, OF NEW STRAITSVILLE, OHIO.

WHEEL.

SPECIFICATION forming part of Letters Patent No. 435,776, dated September 2, 1890.

Application filed December 19, 1889. Serial No. 334,283. (No model.)

*To all whom it may concern:*

Be it known that I, ROBERT STALTER, a citizen of the United States, residing at New Straitsville, in the county of Perry and State of Ohio, have invented certain new and useful Improvements in Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to wheels, and is designed as an improvement on my patent, No. 413,740, issued October 29, 1889.

The object of the invention is to provide a wheel-hub that will be self-lubricating and which will be cast solid and have flanges to embrace the sides of the spokes.

The improvement consists of the novel features, which will be hereinafter more fully described and claimed, and which are shown in the annexed drawings, in which—

Figure 1:
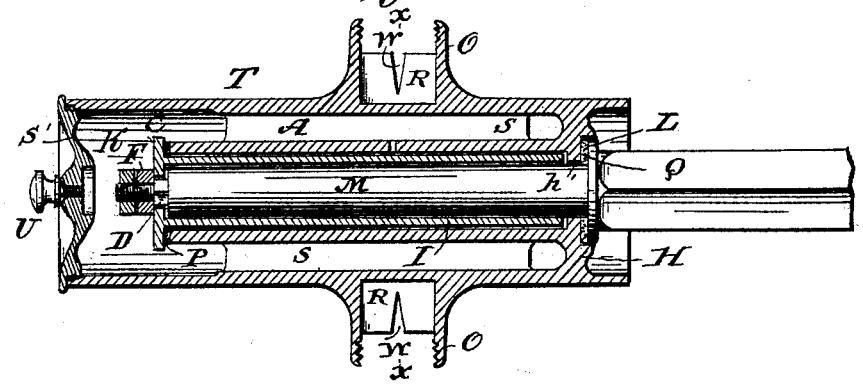
Figure 2:
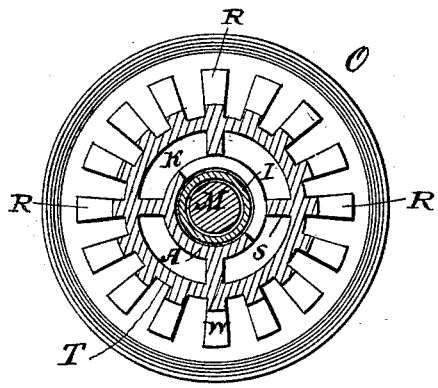
Figure 3:
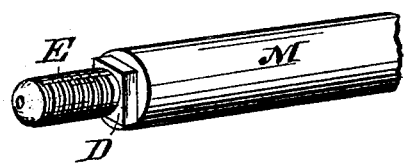
Figure 4:
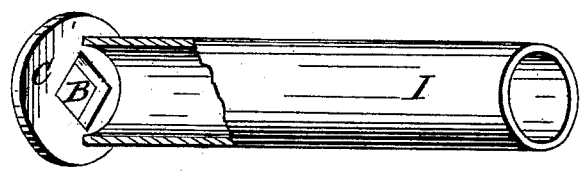

Figure 1 is a central vertical section through a hub embodying my invention. Fig. 2 is a cross-section on the line X X of Fig. 1. Fig. 3 is a perspective detail of the end of the axle. Fig. 4 is a detail perspective view, parts being broken away, of the sleeve.

The wheel-hub is composed of two annular concentric walls A and T, united at the rear end by the plate or vertical wall H, formed integral with the two concentric shells or cylinders A and T, and which forms the back or axle-shoulder end of oil-chamber K. The ribs S, of which there are four, unite the walls A and T, with which they are cast solid, and run horizontally through the said oil-chamber and are designed to make solid and hold in place the wall A. These ribs do not extend to the front end of the wall A, but terminate short thereof, so as not to obstruct the free flow of the oil into the oil-chamber K.

The plates H extend inward to form the flange *h*, which has for its object the following three principles, which are embodied in my patent hereinbefore referred to: First, a shoulder for axle-collar L; second, to form a lock-shoulder with sleeve I; third, to admit of the oil or other lubricant to come in direct contact with the axle-sleeve I; also, by means of its being cast solid with the hub it is impossible for the lubricant to run out or waste. The axle-collar L takes a bearing in and against said flanged plate H. Sleeve I passes over axle M and takes a firm bearing against inside of flange *h*; said sleeve I being held firmly on axle M by suitable means. The front end of sleeve I is provided with a square hole to fit over the reduced and square end D of axle M, which end is rounded at E, so that a thread may be cut thereon to receive the nut F. Obviously the end E may be left off and a screw tapped into square end D of axle M. Sleeve I has inner flange B at its outer end, which bears against the square end D on the axle, and the fastening means, as nut F, is caused to bear against said flange B and bind it between the square end D and the said nut. By this means all rattle or lateral motion in the hub A or sleeve I is prevented. The sleeve I may be made of any kind of metal, or alloy or composition.

The outer end or shell of the hub T is provided with a cap S' threaded and screwed into the end of said hub T. This cap is provided with a hole in the center to admit of the oil being put into the oil-chamber. This hole may be closed up by means of a thumb or other screw U.

Leather washers Q and P are provided, so as to make the running of the wheel noiseless. Oilways are provided in wall A to admit the oil on the bearing or sleeve I, whereby the hub will freely turn on said sleeve I. The sleeve I is provided with an outer flange C, which overlaps the end of the wall A, and which, in conjunction with rear end of sleeve that bears in and against flange *h*, forms a lock and prevents the wheel from coming off the axle, but permits it to turn freely thereon. The sleeve I, when worn, may be turned half around, thereby presenting a new bearing-surface. The hub A, turning on the said sleeve I, the oil or lubricant being held above the lower side or bearing of hub A by reason of flange *h*, causes the said sleeve to run in oil to the depth of the said collar H before any can escape, causing all the wear to be made in oil.

The center of the side of the hub is provided with double flanges O, circular in form.

Apertures are provided to receive the tenon ends of the spokes. The insides of flanges O are provided with small teeth or serrations, so that when the spokes are driven in the serrations or corrugations are pressed into and against the spokes with the flanges, and are held firmly against said spokes by means of rivets passing through said flanges and spoke or spokes. The V-shaped groove W, formed in the divisions R between the flanges O, is sufficiently deep to permit the flanges O being pressed together after the spokes are in position.

Having fully described my invention, what I claim, and desire to secure by Letters Patent, is—

1. The combination, with the hub having a flanged plate H, and the axle having a collar L to bear against one side of flanged plate H, and having square end D, of the sleeve I, held on the axle and obtaining a bearing on the opposite side of flanged plate H, the front end of the sleeve having outer flange C and inner flange B, the latter fitting the squared end D, substantially as and for the purpose described.

2. The wheel-hub composed of two concentric walls, between which is formed an oil-chamber K, the plate H, closing the inner end of the oil-chamber and having flange $h$, and the ribs extending lengthwise of the wheel-hub and cast solid with the said two walls and terminating short of the end of the inner wall, substantially as described.

3. The chambered wheel-hub having oil-passage and having flanged plate H, and having spoke sockets and flanges O, which flanges have corrugations on their opposing sides and are adapted to be pressed on the spokes of the axle having collar L, and the sleeve held on the axle adapted to bear on the end of the wall A and on the flanged plate H, substantially as described.

4. The herein-described hub, having flanges O O and spoke-sockets between the flanges, and having a V-shaped groove in the divisions R between the flanges, whereby the said flanges can be pressed together, substantially as described.

In testimony whereof I affix my signature in presence of two witnesses.

ROBERT STALTER.

Witnesses:
SAMUEL RAYBOULD,
OSCAR S. NEWMAN.